United States Patent Office 2,778,405
Patented Jan. 22, 1957

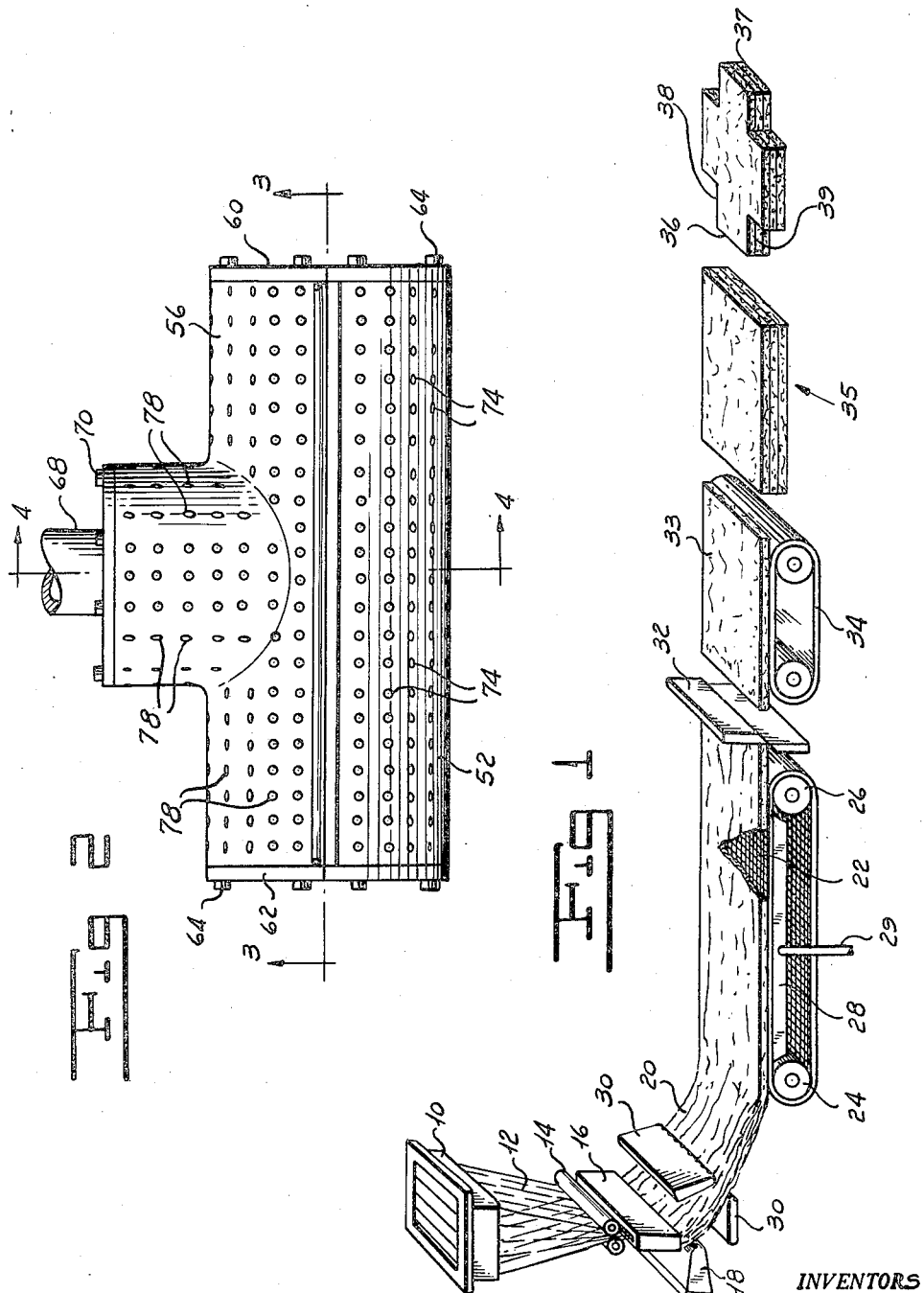

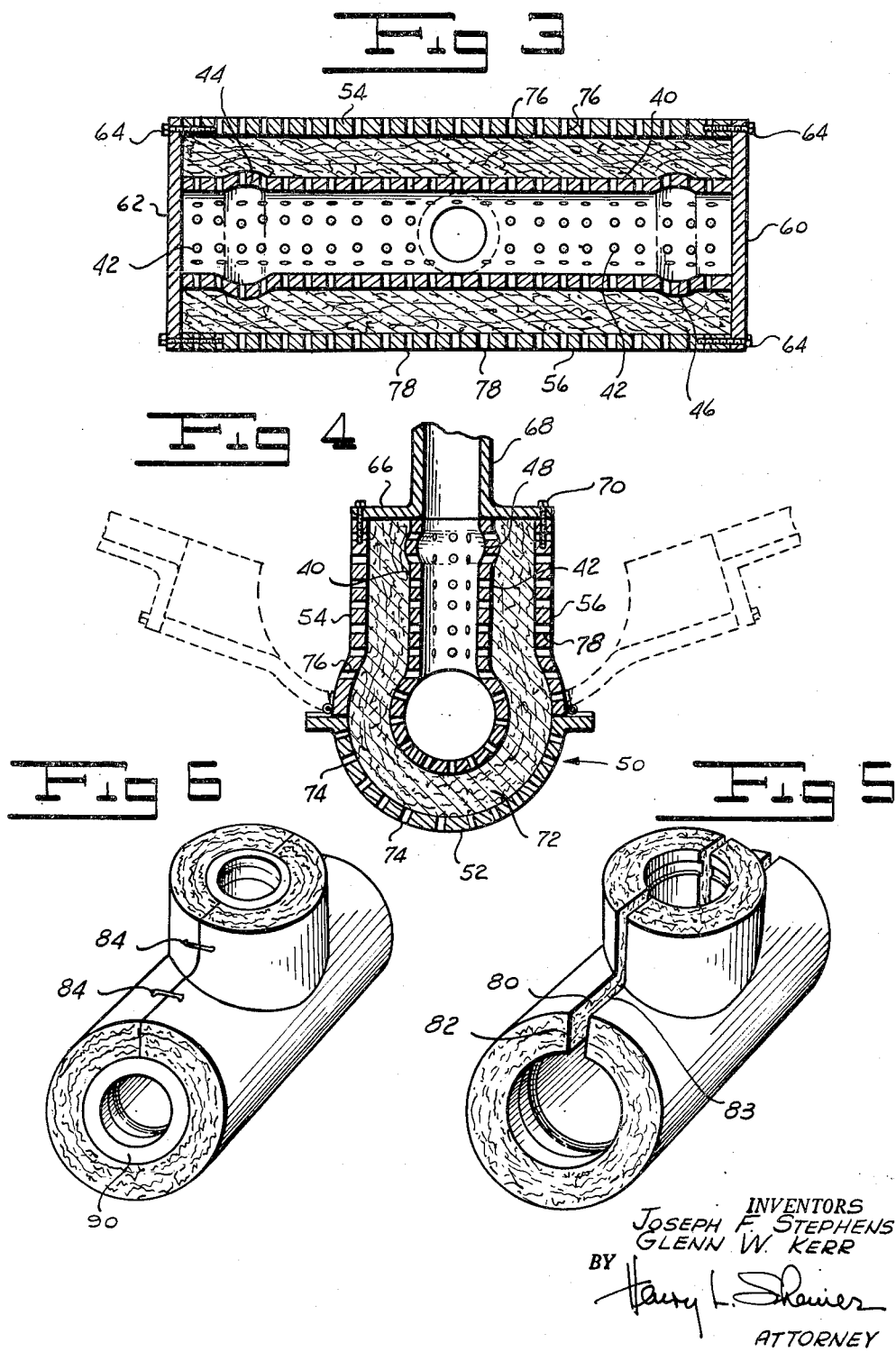

2,778,405

PIPE JOINT COVERING AND METHOD OF MAKING THE SAME

Joseph F. Stephens, Kansas City, Mo., and Glenn W. Kerr, Mission, Kans., assignors to Gustin-Bacon Manufacturing Co., Kansas City, Mo., a corporation of Missouri Application March 11, 1953, Serial No. 341,636

8 Claims. (Cl. 154—28)

Our invention relates to an improved pipe joint covering and method of making the same and more particularly to an improved thermal insulation for pipe joints such as T's, L's and the like and an improved process for producing the same.

In our copending application, Serial No. 318,856, filed November 5, 1952, we have shown an improved pipe covering which is to be utilized as a thermal insulation and a method of making the same so constructed as to give the pipe covering properties of resiliency and dimensional stability or shape-retention as to enable it to be placed around a pipe by springing apart the edges of a single longitudinally extending slit without damage to the structure of the pipe covering. The resiliency of the covering is such as to enable the pipe insulation, when released, to spring back to its original shape and to encircle and snugly engage the pipe being insulated or covered.

In systems formed of pipes, joints are frequently needed such as L's or T's where a pipe line is to change its direction or where one pipe is to join another at an angle thereto. Pipe joints for making these connections are well known to the art. The pipe joint coverings of the prior art which are applied in the form of hemicylinders or halves formed by diametrically extending planes are difficult to apply, requiring envelopes, jackets or bands to secure the complementary halves in position and are formed of materials of comparatively high density. Furthermore, the more efficient pipe joint coverings of the prior art are fragile. If the coverings do not fit snugly they are not properly supported and hence vulnerable to imposed loads or blows. If the two complementary halves do not completely engirdle the pipe joint there is an opening through which considerable heat loss will be sustained.

It is not possible to use the method of our copending application to make pipe joint coverings and we have developed the instant method as an improvement over that shown in our copending application and have provided an improved novel product produced by our method.

One object of our invention is to provide thermal insulation for pipe joints which has a very high resistance to heat flow in proportion to its weight and which is not fragile or easily broken.

Another object of our invention is to provide a pipe joint covering which is flexible and yet capable of retaining its shape and of resiliently conforming to tolerance variations in pipe joints and yet snugly fitting the pipe joint.

Another object of our invention is to provide a resilient pipe joint insulation provided with a single longitudinal slit which may be distorted sufficiently at the slit to fit over the pipe joint having an outside diameter equal to the inside diameter of the pipe joint insulation without delamination or breaking and which will return substantially to its original shape when fitted over the pipe joint.

Still another object of our invention is to provide a resilient, dimensionally stable pipe joint insulation wherein the shape-retaining qualities result from the material rather than from a jacket applied to the material.

A further object of our invention is to provide a pipe joint covering which, when placed about a pipe joint, will retain its embracing position without the benefit of envelopes, sleeves or bands.

Another object of our invention is to provide a pipe joint covering having a longitudinal slit or opening presenting two edges which may be spread apart to enable the pipe joint to be placed within the covering for which the covering has been dimensioned and to flex through the covering material in being so spread apart without delamination, breakage or otherwise suffering impairment of its structure, and further, which when released from the spread position will snap back and encircle and snugly fit the pipe joint.

Still another object of our invention is to provide an insulating pipe joint covering which can be transported and applied without breakage and installed with ease and with minimum cost, labor and time.

Another object of our invention is to provide a method of making our improved pipe joint insulation.

A further object of our invention is to provide an improved method of making thermal pipe insulation.

Other and further objects of our invention will appear from the following description.

In general our invention contemplates a thermal pipe joint insulation formed of glass fibers bonded with a binder and molded to the desired predetermined form by heat. Pipe joint insulations of the prior art which are formed of glass fibers bonded with a binder are of high density and possess little inherent resiliency or elasticity. Because of this, they have had to be made of two sections adapted to be fitted about a pipe joint. We have discovered that by controlling the diameter of the glass fibers within predetermined limits, by proportioning the weight of the binder with respect to the glass fibers or with respect to the weight of the finished product within predetermined limits and by controlling the density to which the material is compressed during the molding of it we can obtain an improved thermal pipe joint insulation having many remarkable properties.

A salient property of the material is its high thermal resistivity per pound of density. Another unique property of our thermal pipe joint insulation is its springiness or elasticity, enabling it to be spread by separating its edges and then having it spring back to substantially its original form. In this manner our pipe joint insulation can be rapidly and expeditiously applied to pipe joints. The split or longitudinally extending slit can, if desired, be secured by manually inserting staples or other fasteners at separated points across the slit. Additional fastening means are not necessary for the retention of our improved pipe joint insulation.

In the accompanying drawings which form part of the instant specification and which are to be read in conjunction therewith and in which like reference numerals are used to indicate like parts in the various views:

Figure 1 is a diagrammatic view showing the process of making our thermal pipe insulation.

Figure 2 is a side elevation drawn on an enlarged scale showing our pipe joint covering in a mold in the process of being formed, the particular pipe joint illustrated being a T.

Figure 3 is a sectional view taken along the line 3—3 of Figure 2.

Figure 4 is a sectional view taken along the line 4—4 of Figure 2 showing the upper portion of the mold in open position in broken lines.

Figure 5 is a perspective view showing an improved pipe joint insulation removed from the mold shown in Figures 2, 3 and 4.

Figure 6 is a perspective view showing the pipe joint covering of Figure 5 in place upon a pipe joint.

More particularly referring now to Figure 1, molten glass is fed to an electrically heated bushing 10 from a molten glass tank (not shown). Primary glass fibers 12 are drawn from a plurality of orifices positioned at the bottom of the bushing 10 by drawing rolls 14. These fibers are pulled at a relatively low speed and are known as "primary fibers." These have diameters ranging between 250 and 600 microns. The primary fibers are passed through fiber guides 16 which serve to spread the fibers longitudinally and maintain them in a common plane. As the fibers emerge from the fiber guides 16, they are subjected to a high-temperature, high-velocity blast from a hot gaseous blast device 18. This device is known to the art and comprises a gas heater adapted to deliver gases at high temperature and a high velocity through a plurality of nozzles. The hot gases melt the primary fibers and produce ultra-fine secondary fibers 20. The velocity of the blast and the temperature of the hot gases are so controlled that the average fiber diameter of the ultra-fine fibers will not be greater than ten microns. It is to be understood, of course, that many fibers will have a thickness of less than a micron and that many fibers may be as thick as fourteen microns in diameter. The temperature of the gases and the velocity of the gas streams encountering the primary fibers emerging from the guides is so controlled that an average fiber diameter of no more than ten microns is achieved. We have found that an average diameter of four microns gives the most advantageous results. If the average diameter of the glass fibers exceeds ten microns, they will be too stiff and break under molding and the inherent resiliency which we seek will not be obtained. Furthermore, it appears that if the fibers have an average diameter of more than ten microns, they will tend to orient themselves longitudinally of the forming conveyor. As a consequence of this, the random distribution of fibers which we achieve and which is desirable does not occur and the improved results and remarkable properties of our improved thermal insulation will not be achieved. The fiber diameter is critical and an average diameter of not more than ten microns must be achieved to produce our improved thermal insulation. The fineness of the fiber does not appear to have any adverse effects. We may make the fibers as fine as we like. There is a tendency, however, if the fibers are made too fine to lose some of the spring strength which we desire. It appears that very fine fibers do not have the stiffness of fibers of larger diameter. The results are obtained, but the finished product tends to be somewhat too flabby. Furthermore, to form fibers having an average diameter of less than one and one-half microns requires a very high velocity gas blast and a high temperature. We have found that the average optimum fiber diameter is about four microns and that the results accrue up to the vicinity of ten microns.

The fibers stream in the blast (it being understood that the conveyor is covered by a hood) and fall to the surface of a forming conveyor 22 which may advantageously take the form of an endless belt of formainous metal positioned upon rollers 24 and 26, one or both of which may be power driven. A vacuum box 28 which is maintained under subatmospheric pressure through an exhaust pump taking suction through pipe 29 is positioned underneath the foraminous belt to hold the mat of fibers upon the belt. While the ultra-fine glass fibers are being formed by the gas blast, they are simultaneously sprayed with a binding material from a plurality of spray guns 30. This coats the glass fibers with a discontinuous coating of binding material. We have found that any of a number of heat-reactive plastics are appropriate for use in our process and in our thermal insulation. Phenol condensation products, melamine resins, urea-formaldehyde resins, urea-melamine resins, vinyl chloride acetate resins, or the like, may be advantageously employed. The rate of flow of the binder from the spray nozzles 30 must be carefully adjusted. We have found that the weight of the binder with respect to the weight of the finished product should lie between fifteen percent and thirty-five percent. Otherwise stated, the binder must be used to an extent of between about seventeen percent to about fifty-five percent by weight based on the weight of the glass filaments. If less than fifteen percent of binder, based on the weight of the finished product, is employed, the thermal insulation is too flabby and loses its resiliency and elasticity. Furthermore, it will delaminate, which apparently contributes to the loss of circumferential elasticity. If more than thirty-five percent, based on the weight of the finished insulation, of binder is employed, the finished product will become boardy and stiff and will lose its inherent circumferential resiliency, which is a salient distinguishing characteristic of our thermal insulation. When this occurs, if a pipe joint covering is stepped on, for example, it will crack or break and not resume its original shape. Our pipe joint insulation can be deformed by pressure and will spring back to its original shape when the pressure is released. An optimum amount of binder with respect to the weight of the glass fibers employed is about thirty-five percent by weight. With respect to the pipe joint covering, the optimum amount of the binder should be about twenty-five percent.

The turbulence of the gas blast is such that, together with the fineness of the fibers, a considerable percentage of them will lie in various directions. Otherwise stated, the fiber orientation in the mat upon the forming conveyor 22 will be random. If the average fiber diameter exceeds the ten microns, the orientation appears to be generally longitudinally of the conveyor for the most part. Stated otherwise, if the average fiber diameter exceeds ten microns, the orientation of the fibers of the mat upon the forming conveyor will be less random and an average small percentage of the fibers will lie generally perpendicular to the surface of the belt and transverse thereto. The random orientation of the fibers appears to be critical, and this in turn in part is a function of the fiber diameter.

The green mat formed of the secondary fibers in combination with the binder is then sheared by shears 32. The green mat 33 is then conveyed by delivery conveyor 34 to a position indicated by the arrow 35 where the sheared sections of the green or uncured mat which are thus being continuously formed are stacked upon one another. The number of sections which are stacked are so controlled that together with the mold volume of the mold in which the curing is to take place a predetermined density is achieved. If, for example, the finished pipe joint covering is to have a wall thickness of one inch and a finished density of three pounds, we would use three one-inch thicknesses of green mat which had a one-pound density in the uncured form. We could, of course, employ six one-half inch thicknesses of one-pound density green mat. It is to be understood, of course, that the density of the green mat is controlled by the rate at which the forming conveyor 22 travels with respect to the blowing of the extremely fine glass fibers being formed. We have found that the density of our finished pipe joint covering is critical and must lie between two pounds per cubic foot and five pounds per cubic foot. If the density is less than two pounds per cubic foot, the material is too flabby and does not have sufficient resiliency and elasticity to spring back to its pipe joint form when opened up and applied to a pipe joint. If the material is made with less than a density of two pounds per cubic foot, a salient feature of our invention is lost. We have found, further, that if the density of our pipe joint covering exceeds five pounds per cubic foot the advantageous results and properties of our thermal insulation are also lost. At a density in excess of five pounds per cubic foot flexibility is lost, and if it is attempted to spread the edges of our pipe joint covering apart for the purpose of applying it over a pipe joint the material becomes subject to delamination and breakage. We have found that an optimum density lies in the vicinity of three pounds per cubic foot and the material has superior elasticity and resiliency to a marked degree.

The stack of green mat sections are then cut to present a developed shape corresponding to the desired pipe fitting being made. For purposes of illustration we have shown in Figure 1 the Maltese cross shape formed by removing, through cutting or the like, square or rectangular sections from each of the four corners of the rectangular stack of mats. The distance between left-hand edge 36 and right-hand edge 37 is the length of the pipe joint covering which is to be made. The distance between edge 38 and edge 39 is equal to the outside circumference of the pipe joint to be covered. It will be understood by those skilled in the art that an L is substantially a half of a T and that the shaping of the stack of uncured mats to give the proper development shape will be different, depending upon the type of pipe joint covering which it is desired to make. It will also be understood by those skilled in the art that the mold to be used will conform to the desired shape of the finished pipe joint covering.

The mat stack will act as a unit since the tackiness of the binder in its uncured form will hold one mat section to the other. This tackiness can be employed to position the stack, shaped as desired, in the mold or around the mold core.

Referring now to Figures 2, 3 and 4, it will be observed that the mold comprises a core 40 formed of any appropriate metal and provided with a plurality of perforations 42. The core 40, it will be understood, is formed with its exterior surface having a configuration such as to produce the contours of the exterior of the particular pipe joint with which the covering is to be used. As is known in the art, there are various types of pipe joints or fittings. For example, there are welded fittings in which we have the same wall thickness as the pipe and approximately the same outside dimensions as the pipe for which they are designed. These fittings are secured to the pipe by welding. There are fittings designed for threaded pipe. These fittings are larger in outside diameter than the pipe with which they are designed to be used. Such fittings have enlarged end portions in the form of circumferential ribs or bands which provide more metal adjacent the extremities of the joint to provide for interior threading. In Figure 3, for example, the core 40 is shown formed with end bands 44 and 46 adapted to conform the contour of the interior of the pipe joint covering to the particular joint or fitting with which it is adapted to be used. Similarly, it will be observed that in Figure 4 the upper portion of the core is formed with a circumferential band 48 analogous to the bands 44 and 46. Cooperating with the core 40 we provide an exterior mold portion indicated generally by the reference numeral 50 in Figure 4. The exterior mold portion comprises a bottom section 52 extending approximately 180° and a pair of upper sections 54 and 56 forming the balance of the mold portions. The sections 54 and 56 are hinged to the lower section 52. It is to be understood, of course, that any appropriate mold may be employed.

It will be observed, however, that the abutting edges of the two mold sections 54 and 56 meet along the plane in which the abutting edges of the pipe joint cover lie when the cover is in the mold. Since the mold compresses the stack, which has been shaped to the developed pipe joint covering to the proper degree to give the desired density, there will be a tendency of some of the binder to flow out of the area between the abutting edges of the mold. In the curing process this binder will harden and form a fin or "flash." This "flash," however, is quite slight and presents no particular problem since it occurs along the locus of the slit in the pipe joint covering.

As pointed out above, there are two methods of placing the tailored stack or build-up in the mold. The first method, and the preferred one, is to place the tailored stack or build-up in the open mold where it will adhere to the mold by the tackiness of the uncured binder. The core is then positioned on the build-up and the mold sections then closed. Another method is to take the same tailored build-up and fold it about the mandrel or core, compressing it by hand in this operation. Again, the tackiness of the uncured binder will cause the build-up to adhere to the mandrel. The mandrel, with the build-up thus stuck to it, is then placed in the mold and the mold closed. After the mold is closed, end plates 60 and 62 are secured to the ends of the mold by means of bolts or screws 64. The top of the mold is also closed with a flange 66 which has secured thereto a conduit 68. The flange is secured to the mold by means of screws or bolts 70. Hot gases are then fed to the interior of the mold. These gases flow out through core openings 42 through the green pipe joint covering 72 and outwardly through the holes 74 formed in the lower mold section 52, the holes 76 formed in the upper mold section 54 and the holes 78 formed in the upper mold section 56. The hot gases set the resinous binder and drive off the resulting moisture and cure the green pipe joint covering to form the finished product. If desired, the curing can take place in any appropriate oven. In this case, however, the curing step will take longer. With our perforated mandrel or mold we can cure a phenol formaldehyde binder in approximately five minutes with a gas temperature of 450° F., the wall thickness of the finished pipe joint covering being one inch.

It will be appreciated that there will be some interlacing of the fibers along the abutting edges of the build-up and some bridging of the abutment by cured resin and "flash." We have found, however, that the split is very readily broken after the material is cured and allowed to cool in the closed mold and that the "flash" is likewise easily removed. If any difficulty is experienced after the mold is opened, a knife or thin blade cut along the abutment permits the abutting edges to be readily separated. The core or mandrel, it will be observed, has substantially the same shape as the exterior of the pipe joint for which the covering is designed. Our covering is readily removable from the mandrel after cooling by simply spreading it apart and removing it from the mandrel, and after removal it will be found that our pipe joint covering will snap back to substantially closed position presenting an appearance as shown in Figure 5. The finished pipe joint covering has surprising inherent resiliency. It can be opened to beyond its internal diameter lengthwise and placed diametrically across the pipe joint to which it is to be applied. It will spring back to the shape shown in Figure 5. A slight opening 80 between the abutting edges 82 and 83 will exist. This opening is eliminated by pressing the abutting edges together and applying staples 84 along the same, as can be seen by reference to Figure 6, which shows a pipe joint covering 70 in place about a T 90. The outside diameter of the extremities of the pipe covering may be tapered, if desired, to bring the ends down to the outside diameter of the pipe insulation which it must complement. This can readily be done in the mold, as will be readily understood by those skilled in the art.

It will also be observed that our method may be employed to make thermal pipe insulation for pipes or ducts of any desired cross section, such as circular, square, rectangular, hexagonal or the like. All that is necessary is to shape the mandrel or core and the mold as desired. The tailoring of the build-up in the case of a pipe covering is quite simple. The width of the build-up is equal to the exterior circumference or periphery of the pipe to be covered. The length of the build-up is equal to the length of the pipe section to be covered.

Our pipe joint covering, as pointed out above, can be secured very simply and expeditiously by pressing U-shaped staples 84 to bridge the slit 80 formed by the abutting edges 82 and 83 of the pipe joint covering. The pipe joint covering is not frangible and will withstand considerable abuse. It can be walked upon or dropped without adverse effects. Its dimensional stability is an outstanding feature and is of tremendous advantage when applying the covering to a pipe joint. One of the products of the prior art is composed of glass fibers bonded with a plastic binder. Its density is six pounds per cubic foot. The average fiber diameter is in excess of eleven microns. The material is punky and friable. It is formed in two separate halves and requires at least two people to apply it. Binding means must be employed to secure the pipe joint covering in place. Its rigidity is such that any bending or flexing will cause it to break.

The physical advantages of our improved pipe joint covering from the standpoint of its thermal insulation value is outstanding. The following table lists the density, the thermal conductivity, the thermal resistivity and the thermal resistivity per pound of density of the various thermal insulations of the prior art as compared with the thermal insulation of our pipe joint covering:

|  | Density (pounds per cubic foot) | (k) Thermal conductivity at 100° F. Mean | (1/k) Thermal resistivity | Thermal resistivity per pound of density |
|---|---|---|---|---|
| Diatomaceous Silica type | 27 | .63 | 1.59 | .059 |
| Laminated Asbestos Felt | 34 | .39 | 2.56 | .075 |
| Corrugated Asbestos type | 12 | .57 | 1.75 | .146 |
| 85% Magnesia, 15% Asbestos | 13 | .39 | 2.56 | .197 |
| Mineral Wool | 13 | .40 | 2.50 | .192 |
| Asbestos Reinforced Calcium Silicate | 11 | .41 | 2.44 | .222 |
| Glass Wool-resin Semi-cylinders | 6 | .25 | 4.00 | .667 |
| Stephens et al | 3 | .24 | 4.17 | 1.39 |

In the above table the corrugated asbestos was 4-ply and is a well-known pipe covering composed of alternate layers of corrugated and plain asbestos paper.

It will be noted that our pipe joint covering has a higher thermal resistivity than any of the well-known thermal insulation materials of the prior art. Thermal resistivity is the reciprocal of thermal conductivity, known to the art as "$k$." "$k$" is defined as the time rate of heat flow through a homogeneous material under steady conditions through unit area per unit temperature gradient in the direction perpendicular to the area. Its value is expressed in B. t. u. per (hour) (square foot) (Fahrenheit degree per inch of thickness). Materials are considered homogeneous when the value of $k$ is not affected by variation in thickness or size of sample within the range normally used in construction. While it was anticipated that our pipe joint covering would have a high thermal resistivity, it could not be expected that its resistivity per pound of density would be more than twice that of other glass wool plastic-bonded materials.

Our pipe joint covering, as will be understood by those skilled in the art, cannot be employed at temperatures in excess of those which deteriorate the binder. For high-temperature use laminated asbestos felt, which is formed of a plurality of layers of asbestos with sponge particles between layers, and the diatomaceous silica types are usually employed. For temperatures involved with low-pressure steam and hot and cold water and for all low-temperature applications, our pipe joint covering appears to be extremely advantageous. Our improved pipe joint covering is nonhygroscopic and will retain its advantageous properties under high-humidity conditions.

It will be seen that we have accomplished the objects of our invention. We have provided an improved pipe joint covering which is light in weight and has a high thermal resistivity. Our covering is easy to handle and to apply to pipe joints, which can be quickly and expeditiously covered with our pipe joint covering by a single workman. We have provided a unitary pipe joint covering in the form of a split element which can be spread apart along the split, slid diametrically over the pipe joint to be insulated or covered, and then can be quickly and easily secured in place by manually pressing U-shaped staples or the like across the slit. Our pipe joint covering will stand considerable abuse and retain its dimensional stability. It can be dropped or stepped upon without adverse effect. Our pipe joint covering provides thermal insulation for pipe joints and has a very high resistance to heat flow in proportion to its weight. We have provided an improved method of making pipe joint covering and an improved method of making pipe covering.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A single piece, preformed, resilient, pipe joint insulation formed of glass fibers having an average diameter of less than ten microns bonded with a binder in an amount between seventeen percent and fifty-five percent by weight, based on the weight of the glass fibers, and having a density between two pounds and five pounds per cubic foot, said pipe joint insulation being formed generally in the shape of a pair of intersecting tubes formed with a slit, said slit lying substantially in a plane common to the longitudinal axes of both tubes, said insulation being adapted to spring back to its preformed shape when released after being deflected.

2. A single piece, preformed, resilient, pipe joint insulation formed of glass fibers having an average diameter of about four microns bonded with a binder in an amount between seventeen percent and fifty-five percent by weight, based on the weight of the glass fibers, and having a density between two pounds and five pounds per cubic foot, said pipe joint insulation being formed generally in the shape of a pair of intersecting tubes formed with a slit, said slit lying substantially in a plane common to the longitudinal axes of both tubes, said insulation being adapted to spring back to its preformed shape when released after being deflected.

3. A single piece, preformed, resilient, pipe joint insulation formed of glass fibers having an average diameter of less than ten microns bonded with a binder in an amount of approximately thirty-five percent by weight, based on the weight of the glass fibers, and having a density between two pounds and five pounds per cubic foot, said pipe joint insulation being formed generally in the shape of a pair of intersecting tubes formed with a slit, said slit lying substantially in a plane common to the longitudinal axes of both tubes, said insulation being adapted to spring back to its preformed shape when released after being deflected.

4. A single piece, preformed, resilient, pipe joint insulation formed of glass fibers having an average diameter of less than ten microns bonded with a binder in an amount between seventeen percent and fifty-five percent by weight, based on the weight of the glass fibers, and having a density of about three pounds per cubic foot, said pipe joint insulation being formed generally in the shape of a pair of intersecting tubes formed with a slit, said slit lying substantially in a plane common to the longitudinal axes of both tubes, said insulation being adapted to spring back to its preformed shape when released after being deflected.

5. A single piece, preformed, resilient, pipe joint insulation formed of glass fibers having an average diameter of about four microns, said glass fibers being deposited at random orientation and held in such random orientation by a binder in amounts between seventeen percent by weight and fifty-five percent by weight, based on the weight of the glass fibers, having a density of about three pounds per cubic foot and a $k$ value of not more than .25 at 100° F. mean temperature, said pipe joint insulation being formed generally in the shape of a pair of intersecting tubes formed with a slit, said slit lying substantially in a plane common to the longitudinal axes of both tubes, said insulation being adapted to spring back to its preformed shape when released after being deflected.

6. A method of making preformed, resilient, thermal insulation of the character described including the steps of forming glass filaments into ultra-fine glass fibers having an average diameter of less than ten microns by subjecting the filaments to the action of a hot gaseous blast, simultaneously spraying the ultra-fine glass fibers with a binder at a rate to provide between seventeen percent and fifty-five percent by weight of binder, based on the weight of the glass fibers, continuously collecting the sprayed ultra-fine glass fibers to form a mat, cutting the mat into sections, superposing a plurality of sections upon one another to form a stack, cutting the stack to desired dimensions and contour, molding the cut stack in a cored mold to the desired form and to a density of between two pounds and five pounds per cubic foot and simultaneously setting the binder.

7. A method as in claim 6 in which said molding step includes disposing the cut stack around the mold core before placing it in the mold.

8. A method as in claim 6 in which said molding step includes placing the cut stack in the mold, depositing the core upon the cut stack and then closing the mold.

References Cited in the file of this patent

UNITED STATES PATENTS

| | | |
|---|---|---|
| 1,899,056 | Powell | Feb. 28, 1933 |
| 1,928,264 | Powell | Sept. 26, 1933 |
| 1,956,377 | Drill | Apr. 24, 1934 |
| 2,288,072 | Collins | June 30, 1942 |
| 2,489,242 | Slayter et al. | Nov. 22, 1949 |
| 2,625,263 | Kice | Jan. 13, 1953 |